United States Patent [19]

Evans et al.

[11] 4,081,588

[45] Mar. 28, 1978

[54] VINYL CHLORIDE POLYMERIZATION PROCESS

[75] Inventors: Dennis Ernest Mackley Evans, Welwyn Garden City; Edwin Robson, Blackpool, both of England

[73] Assignee: Imperial Chemical Industries Limited, United Kingdom

[21] Appl. No.: 691,299

[22] Filed: Jun. 1, 1976

Related U.S. Application Data

[63] Continuation of Ser. No. 473,674, May 28, 1974, abandoned.

[30] Foreign Application Priority Data

Jun. 8, 1973    United Kingdom .............. 27331/73
Jan. 23, 1974    United Kingdom ................ 3118/74

[51] Int. Cl.² ....................... C08F 2/16; C08F 114/06; C08F 214/06

[52] U.S. Cl. ....................................... 526/87; 526/86; 526/344; 526/345

[58] Field of Search ..................... 526/80, 87, 86, 344, 526/345

[56] References Cited

U.S. PATENT DOCUMENTS

| 3,324,097 | 6/1967 | Pears .............................. 526/344 X |
| 3,678,021 | 7/1972 | Chatelain ......................... 526/87 X |
| 3,974,133 | 8/1976 | Evans ................................. 526/344 |

*Primary Examiner*—Christopher A. Henderson
*Attorney, Agent, or Firm*—Cushman, Darby & Cushman

[57] ABSTRACT

A process for the production of vinyl chloride polymers suitable for the production of pastes, in which some of the monomer to be used in the polymerization is subjected to homogenization in the presence of a surfactant and a monomer soluble initiator, the remainder of the monomer being admixed with the homogenized dispersion and the combined fractions polymerized.

6 Claims, No Drawings

VINYL CHLORIDE POLYMERIZATION PROCESS

This is a continuation of application Ser. No. 473,674, filed May 28, 1974, now abandoned.

The present invention relates to the polymerisation of vinyl chloride and more particularly to a process of producing vinyl chloride polymers suitable for the production of pastes.

It is known to produce vinyl chloride polymers using a process in which a dispersion of vinyl chloride, or vinyl chloride and a copolymerisable monomer, in the presence of a surfactant, is homogenised by subjecting it to violent shearing action in, e.g. a colloid mill, a high speed pump, or an ultrasonic device, and the resulting homogenised dispersion polymerised in a stirred autoclave using a monomer soluble initiator.

The vinyl chloride polymers produced by such a process are composed of very small particles (usually in the range of 0.1 to 2 microns) which can be dispersed in plasticisers to form relatively stable dispersions known as pastes. These are useful in a variety of applications such as shaping process, e.g. involving open casting, rotational casting, slush moulding, compression and injection moulding, or in coating processes, e.g. by dipping, spraying or spreading techniques, or in the manufacture of foams.

The particle size distributions of vinyl chloride polymers made using such a homogenised dispersion polymerisation technique are such that pastes made with the polymers possess particularly advantageous properties such as a low initial viscosity and a slow rate of increase in viscosity on ageing.

The homogenised dispersion technique, however, suffers from the drawback that the homogenisation step (1) necessitates the use of expensive, sometimes bulky homogenisation equipment, the available homogenisation capacity limiting the quantity of monomer which can be polymerised using the technique and (2) increases the cycle time of the vinyl chloride polymerisation, resulting in decreased productivity. We have now discovered a process whereby these drawbacks may be considerably reduced.

According to the present invention we provide a process for the production of a vinyl chloride polymer which comprises polymerising vinyl chloride or vinyl chloride and up to 30% by weight thereof of at least one other ethylenically unsaturated monomer copolymerisable therewith, wherein before the commencement of polymerisation a mixture of monomeric material to be polymerised and water which contains a fraction of the total quantity of monomeric material to be polymerised is homogenised in the presence of an emulsifier and/or suspension agent and a monomer soluble polymerisation initiator and mixed with the remainder of the monomeric material to be used in the polymerisation, the combined fractions then being polymerised to form the vinyl chloride polymer.

Thus in the process of our invention only part of the monomer to be polymerised is subjected to homogenisation whereas hitherto, all of the monomer to be polymerised was included in the homogenisation step. In spite of homogenising only part of the monomeric charge the resulting vinyl chloride polymer is, most surprisingly, still most suitable as a paste-forming material in the applications mentioned hereinbefore, possessing in particular acceptably low initial viscosity and an acceptably slow rate of increase in viscosity on ageing.

It is thus seen that the process of our invention allows a shorter cycle time per reaction batch to be achieved because of the reduction in the time taken up in the homogenisation step as a result of less than the total charge of monomer to be polymerised being subjected to homogenisation.

Furthermore, in cases where one homogeniser is used to provide the homogenised charge for a number of reactors in sequence, the process allows any reduction in cycle time achieved by other means to be taken advantage of because of the reduction of the time for which the homogeniser is engaged with any particular reactor. In this way, the time which a reactor could stand idle, e.g. because of a reduction in the time taken to complete the polymerisation/polymer discharge/reactor cleaning sequence, may be diminished or eliminated altogether.

In addition the process of our invention may allow the use of smaller capacity homogenisation equipment and/or allow the use of fewer homogenisers for a given number of reactors.

It is to be appreciated that in the process of the invention, homogenisation of the material which is intended for homogenisation should be as thorough and as effective as possible, that is to say it is desirable that every part of the charge intended for homogenisation should in fact be properly and uniformly homogenised. If this is not realized, then the presence of unhomogenised charge may well result in a batch having an unacceptable particle size distribution, e.g. containing pebble-like product and/or build-up or even entirely coagulated.

The possibility of ineffective homogenisation mainly arises because of the so called "setting up" period of the homogenisation step, by which we mean the initial period during which the charge to be homogenised is passed through the homogeniser and during which the controls of the homogeniser are being "set" to produce the required homogenising power (e.g. where a high speed pump is used as the homogeniser, the settings are the different pressures in the stages of the pump). It is evident that during the "setting up" period prior to homogenisation proper, the material emerging from the homogeniser is likely to be unhomogenised or poorly homogenised. To overcome this problem, the initially emerging material is recirculated back to the stock of material being passed to the homogeniser.

The period of recirculation necessary to avoid unacceptable product will vary according to the size of the charge being homogenised. In the case of a relatively small charge such as might be used on a laboratory or pilot plant scale, the recirculation time need not be very long since the chances of each part of the unhomogenised or poorly homogenised material being rapidly passed through the homogeniser once more are high in view of the smallness of the charge. On a production scale, however, where a much larger charge to be homogenised is involved, the chances of the initially emerging material again being passed through the homogeniser are not so high, so that a longer recirculation time is required.

It is not possible to quantify generally the necessary recirculation time since this will depend, inter alia, on the particular homogenising apparatus being used, the homogenising power being employed for any particular homogenising apparatus and, as explained above, on the size of the charge being homogenised. In practice, the minimum necessary recirculation time should be determined experimentally for a given polymerisation system by varying the recirculation time until products having acceptable particle size are reproducibly obtained.

Additionally, it is possible to closely match the properties of a polymer made by homogenising the entire charge of monomer by varying the recirculation time experimentally in any particular system until the closest match is obtained.

In the process of the invention, in order to produce a meaningful economic improvement it is best not to homogenise more than 90% by weight of the monomeric material to be polymerised. However, much less than this need be homogenised and we have found that an extremely small fraction of the total monomeric material to be polymerised can be homogenised without detriment to the resulting polymer properties, the lower limit of the homogenised fraction being set only by the limit of the solubility of the initiator in the monomer. Thus it is possible that as low as 3% by weight of the total monomeric material to be polymerised may be homogenised (the rest being added after homogenisation) without detriment to the polymer properties.

For practical purposes, however, we prefer to homogenise at least 6% of the total monomeric material to be polymerised, usually between 6 and 75%, preferably between 15 and 60%, and particularly preferably between 25 and 50%.

It is advantageous in the process of our invention, to homogenise only a fraction of the water to be used in the polymerisation (the unhomogenised water and monomer being added after homogenisation). In this way, the economic advantages mentioned hereinbefore are accentuated.

In such cases, it is best not to homogenise more than 90% by weight of the total amount of water to be used for the polymerisation. Again, however, much less than this need be homogenised and we have found that as low as 10% by weight of the total water charge to be used in the polymerisation may be homogenised (the rest being added after homogenisation) without detriment to the polymer properties.

For practical purposes, however, we prefer in such cases to homogenise at least 20% of the total water charge, usually between 20 and 75%, preferably between 25 and 60% and particularly preferably between 30 and 50%.

It is, of course, possible to operate our process by homogenising a fraction of the monomeric material to be polymerised and the total amount of water to be used in the polymerisation.

Part of the emulsifier and/or suspension agent to be used during polymerisation may be added with the unhomogenised fraction. Alternatively the whole of the emulsifier and/or suspension agent to be used during polymerisation may be included with the homogenised fraction. Preferably, all of the monomer soluble initiator to be used in the polymerisation should be included with the homogenised fraction to avoid the possibility of coarse products being obtained.

Any emulsifying agent or suspension agent may be used in the process of the invention. The emulsifying agents may be anionic, cationic or non-ionic. We prefer, however, to use anionic emulsifying agents since they are more efficient in stabilising the resultant polymer latex. Examples of anionic agents are the sodium salts of sulphated and sulphonated hydrocarbons and fatty acids such as dioctyl sodium sulphosuccinate, sulphonated diesel oil and sodium lauryl sulphate and the sodium salts of alkyl aryl sulphonates such as sodium dodecyl benzene sulphonate.

Suspension agents which may be used include protective colloids such as cellulose derivatives and partially hydrolysed polyvinyl acetates.

Any suitable free-radical yielding monomer-soluble initiator or combination of initiators may be used in the process of our invention. Suitable initiators include acyl peroxides, such as lauroyl peroxide and acetyl cyclohexyl sulphonyl peroxide, and azo compounds such as azodiisobutyronitrile. Diakyl peroxy dicarbonates may also be used as described in our United Kingdom Patent Specification No. 978,875 reference to which is incorporated herein.

In the process of our invention homogenisation may be effected using any suitable apparatus such as those mentioned hereinbefore. We have found that homogenisation is simply effected and readily controlled by using a high speed pump. A two-stage pump gives very good results.

To produce the homogenised dispersion according to the process of our invention a stirred premix of the monomer to be homogenised, water, emulsifier or suspension agent and initiator may, e.g. be formed in a premix vessel and the resulting suspension passed through the homogeniser (after suitable recirculation if necessary) and in to the reactor.

Since the homogenised dispersion is to contain at least part of the polymerisation initiator, the homogenisation is usually effected at a temperature well below that at which polymerisation occurs. In general homogenisation is suitably effected at about ambient temperature or a little above, say 10° C to 20° C. Polymerisation is usually effected at a temperature between 40° C and 70° C, particularly between 50° C and 65° C. The choice of polymerisation temperature is governed to a large extent by the required mechanical properties of the resulting polymer.

On the completion of the polymerisation, the polymer may be separated from the water by any suitable drying technique, such as tray drying, drum drying or spray drying.

The present invention is illustrated by the following Examples. All percentages and parts are by weight.

Example 1 is intended to be a control in which the total amounts of monomeric material and water used in the polymerisation are homogenised.

Examples 2 and 3 demonstrate the process of the invention where a fraction (50% and 25% respectively) of the monomeric material to be polymerised is homogenised, the total amount of water used in the polymerisation also being subjected to homogenisation and all the emulsifier used in the polymerisation being included with the homogenised fraction.

Examples 4 and 5 demonstrate the process of the invention as carried out in Examples 2 and 3 but where only a fraction of the emulsifier used (50% and 25% respectively) is included with the homogenised fraction.

Examples 6 and 7 demonstrate the process of the invention where a fraction (50% and 12.5% respectively) of the monomeric material, a fraction (50% and 12.5% respectively) of the water and a fraction (50% and 12.5% respectively) of the emulsifier are subjected to homogenisation.

In Example 8, a fraction (25%) of the monomeric material to be polymerised is homogenised and a fraction (25%) of the total amount of water used is homogenised, all of the emulsifier used being included with the homogenised charge.

Example 9 is a control directed towards the production of a vinyl chloride/vinyl acetate copolymer in which the total amount of monomeric material and water used in the polymerisation are homogenised.

Example 10 is also directed towards the production of a vinyl chloride/vinyl acetate copolymer and demonstrates the process of the invention where only a fraction (50%) of the vinyl chloride intended to be polymerised is homogenised and only a fraction (50%) of the total amount of water used is homogenised, all of the vinyl acetate and emulsifier being included with the homogenised charge.

EXAMPLE 1

50 kg of water, 40 kg of vinyl chloride, 400 g of sodium dodecyl benzene sulphonate, 80 g of lauroyl peroxide and 20 g of dicetyl peroxydicarbonate were added to a stainless steel vessel from which most of the atmospheric oxygen had been removed by evacuation and purging with nitrogen. The mixture was stirred for fifteen minutes to give a coarse dispersion of the vinyl chloride in water. This mixture was then passed (after 5 minutes recirculation time) through a two-stage high-speed pump homogeniser, the pressure of the first stage being 3000 p.s.i. (20685 kN/m$^2$), and of the second stage 500 p.s.i. (3448 kN/m$^2$) and the homogenised mixture was passed to a stirred evacuated reaction vessel.

The reaction vessel was heated to 50° C with stirring and the temperature was maintained constant at 50° C for the duration of the reaction. After 9 hours the pressure in the reaction vessel began to drop and after a further 3 hours polymerisation, the remaining pressure was released.

The product was in the form of a polymer latex which was dried by spray drying. 100 parts of the dry powder were mixed with 66 parts of dialphanyl phthalate to yield a paste having the following viscosity characteristics:

| | |
|---|---|
| Initial viscosity | 19 poise |
| viscosity after 14 days storage at 23° C | 38 poise |

These viscosity characteristics are acceptable for a paste polymer.

EXAMPLE 2

50 kg of water, 20 kg of vinyl chloride, 400 g of sodium dodecyl benzene sulphonate, 80 g of lauroyl peroxide and 20 g of dicetyl peroxydicarbonate were added to a stainless steel vessel from which most of the atmospheric oxygen had been removed by evacuation and purging with nitrogen. The mixture was stirred for fifteen minutes to give a coarse dispersion of the vinyl chloride in water. This mixture was then passed through a two-stage high-speed pump homogeniser, (5 minutes recirculation time) the pressure of the first stage being 3000 p.s.i. and the second stage 500 p.s.i. and the homogenised mixture was passed to a stirred reactor vessel from which most of the oxygen had been removed, and to which (after removal of the oxygen) had previously been added 20 kg of vinyl chloride. Polymerisation was then carried out at 50° C as for Example 1, the time taken for the pressure to begin to drop being 8 hours.

The product was in the form of a latex and was spray dried. The viscosity characteristics of the polymer were determined in the same manner as described in Example 1 and were as follows:

| | |
|---|---|
| Initial viscosity | 20 poise |
| viscosity after 14 days storage at 23° C | 55 poise |

These viscosity characteristics are acceptable for a paste-forming polymer.

EXAMPLE 3

The procedure of Example 2 was repeated except that the stainless steel vessel charge was 50 kg water, 10 kg vinyl chloride, 400 g of sodium dodecyl benzene sulphonate, 80 g of lauroyl peroxide and 20 g of dicetyl peroxydicarbonate and the reactor previously contained 30 kg of vinyl chloride.

The time taken for the pressure to begin to drop in the polymerisation was 9 hours.

The viscosity characteristics of the polymer were as follows:

| | |
|---|---|
| Initial viscosity | 24 poise |
| viscosity after storage for 14 days at 23° C | 43 poise |

EXAMPLE 4

The procedure of Example 2 was repeated except that the stainless steel vessel charge was 50 kg water, 20 kg vinyl chloride, 200 g sodium dodecyl benzene sulphonate, 80 g lauroyl peroxide and 20 g dicetyl peroxydicarbonate and the reactor previously contained 200 g sodium dodecyl benzene sulphonate (as an aqueous solution) and 20 kg of vinyl chloride.

The time taken for the pressure to begin to drop in the polymerisation was 9 hours.

The viscosity characteristics of the polymer were as follows:

| | |
|---|---|
| Initial viscosity | 19 poise |
| viscosity after 14 days storage at 23° C | 35 poise |

EXAMPLE 5

The procedure of Example 2 was repeated except that the stainless steel vessel charge was 50 kg water, 10 kg vinyl chloride, 100 g sodium dodecyl benzene sulphonate, 80 g lauroyl peroxide and 20 g dicetyl peroxydicarbonate and the reactor previously contained 30 kg of vinyl chloride and 300 g of sodium dodecyl benzene sulphonate (as an aqueous solution).

The time taken for the pressure to begin to drop in the polymerisation was 11 hours.

The viscosity characteristics of the polymer were as follows:

| | |
|---|---|
| Initial viscos8ty | 27 poise |
| viscosity after storage for 14 days at 23° C | 38 poise |

EXAMPLE 6

The procedure of Example 2 was repeated except that the stainless steel vessel charge was 25 kg water, 20 kg vinyl chloride, 200 g sodium dodecyl benzene sulphonate, 80 g lauroyl peroxide and 20 g dicetyl peroxydicarbonate and the reactor previously contained 25 kg of water, 20 kg of vinyl chloride and 200 g of sodium dodecyl benzene sulphonate.

The time taken for the pressure to begin to drop in the polymerisation was 8 hours.

The viscosity characteristics of the polymer were as follows:

| | |
|---|---|
| Initial viscosity | 22 poise |
| viscosity after storage for 14 days at 23° C | 35 poise |

EXAMPLE 7

The procedure of Example 2 was repeated except that the stainless steel vessel charge was 6.25 kg water, 5 kg vinyl chloride, 50 g sodium dodecyl benzene sulphonate, 80 kg lauroyl peroxide and 20 g dicetyl peroxydicarbonate, and the reactor previously contained 35 kg vinyl chloride, 43.5 kg water and 350 g sodium dodecyl benzene sulphonate.

The time taken for the pressure to begin to drop was 9 hours.

The viscosity characteristics of the polymer were as follows:

| | |
|---|---|
| Initial viscosity | 24 poise |
| viscosity after 14 days storage at 23° C | 34 poise |

EXAMPLE 8

The procedure of Example 2 was repeated except that the stainless steel vessel charge was 12.5 kg water, 10 kg vinyl chloride, 400 g sodium dodecyl benzene sulphonate, 80 g lauroyl peroxide and 20 g dicetyl peroxydicarbonate, the recirculation time was 1 minute and the reactor previously contained 30 kg vinyl chloride and 37.5 kg water.

The time taken for the pressure to begin to drop was 8.5 hours.

The viscosity characteristics of the polymer were as follows:

| | |
|---|---|
| Initial viscosity | 17 poise |
| viscosity after 14 days storage at 23° C | 32 poise |

EXAMPLE 9

46 kg of water, 37.6 kg of vinyl chloride, 2.4 kg of vinyl acetate, 280 g sodium dodecyl benzene sulphonate, 80 g of lauroyl peroxide and 20 g of dicetyl peroxydicarbonate were added to a stainless steel vessel from which most of the atmospheric oxygen had been removed by evacuation and purging with nitrogen. The mixture was stirred for fiteen minutes to give a coarse dispersion of the vinyl chloride in water. This mixture was then passed (after 5 minutes recirculation time) through a two-stage high-speed pump homogeniser, the pressure of the first stage being 3000 p.s.i. (20685 kN/m²), and of the second stage 500 p.s.i. (3448 kN/m²) and the homogenised mixture was passed to a stirred evacuated reaction vessel.

The reaction vessel was heated to 54° C with stirring and the temperature was maintained constant at 54° C for the duration of the reaction. After 5 hours the pressure in the reaction vessel began to drop and after a further 3 hours polymerisation, the remaining pressure was released.

The product was in the form of a polymer latex which was dried by spray drying. 100 parts of the dry powder were mixed with 66 parts of dialphanyl phthalate to yield a paste having the following viscosity characteristics:

| | |
|---|---|
| Initial viscosity | 29 poise |
| viscosity after 14 days storage at 23° C | 150 poise |

These viscosity characteristics are acceptable for a paste-forming vinyl chloride/vinyl acetate copolymer.

EXAMPLE 10

23 kg of water, 18.8 kg of vinyl chloride, 2.4 kg of vinyl acetate, 280 g of sodium dodecyl benzene sulphonate, 80 g of lauroyl peroxide and 20 g of dicetyl peroxydicarbonate were added to a stainless steel vessel from which most of the atmospheric oxygen had been removed by evacuation and purging with nitrogen. The mixture was stirred for fifteen minutes to give a coarse dispersion of the vinyl chloride in water. This mixture was then passed through a two-stage high-speed pump homogeniser, (4 minutes recirculation time) the pressure of the first stage being 3000 p.s.i. and the second stage 500 p.s.i. and the homogenised mixture was passed to a stirred reactor vessel from which most of the oxygen had been removed, and to which (after removal of the oxygen) had previously been added 18.8 kg of vinyl chloride and 23 kg of water. Polymerisation was then carried out at 54° C, the time taken for the pressure to begin to drop being 5 hours.

The product was in the form of a latex and was spray dried. The viscosity characteristics of the polymer were determined in the same manner as described in Example 7 and were as follows:

| | |
|---|---|
| Initial viscosity | 25 poise |
| viscosity after 14 days storage at 23° C | 110 poise |

We claim:
1. In a process for the production of a vinyl chloride polymer which comprises polymerizing an aqueous dispersion of vinyl chloride or vinyl chloride and up to 30% by weight thereof at least one other ethylenically unsaturated monomer copolymerizable therewith, wherein before the commencement of polymerization a mixture of monomeric material to be polymerized and water is homogenized in the presence of at least one member of the group consisting of emulsifiers and suspension agents and a monomer soluble polymerization initiator, the improvement in which the mixture which is homogenized before commencement of polymerization contains 6–75% of the total quantity of monomeric material to be polymerized in the aqueous dispersion, and at least 10% by weight of the water and at least a portion of the initiator to be used in the polymerization reaction and, after homogenization, the homogenized mixture is mixed with the remainder of the monomeric material to be used in the polymerization, which remainder has not been homogenized and has been kept out of contact with the homogenized mixture, to form the aqueous dispersion which is then polymerized.

2. A process according to claim 1 wherein said mixture of monomeric material to be polymerized and water which contains a fraction of the total quantity of monomeric material to be polymerized contains up to 90% by weight of the total quantity of water to be used in the polymerization reaction.

3. A process according to claim 1 wherein said mixture of monomeric material to be polymerized and water which contains a fraction of the total quantity of monomeric material to be polymerized contains 20% to 75% by weight of the total quantity of water to be used in the polymerization reaction.

4. A process according to claim 1 wherein said mixture of monomeric material to be polymerized and water which contains a fraction of the total quantity of monomeric material to be polymerized contains 15% to 60% by weight of the total quantity of monomeric material to be polymerized.

5. A process according to claim 1 wherein a fraction of at least one member of the group consisting of the emulsifying agent and the suspension agent to be used in the polymerization reaction is included with said mixture of monomeric material to be polymerized and water which contains a fraction of the total quantity of monomeric material to be polymerized.

6. A process according to claim 1 wherein all of the monomer-soluble initiator to be used in the polymerization reaction is included with said mixture of monomeric material to be polymerized and water which contains a fraction of the total quantity of monomeric material to be polymerized.

* * * * *